Patented July 29, 1952

2,605,252

UNITED STATES PATENT OFFICE 2,605,252

STABILIZATION OF RUBBER MATERIALS WITH CRESYLIC ACID DERIVATIVES

Leland J. Kitchen, Akron, Ohio, assignor to The Firestone Tire & Rubber Company, Akron, Ohio, a corporation of Ohio No Drawing. Original application July 1, 1948, Serial No. 36,298. Divided and this application July 28, 1951, Serial No. 239,179

8 Claims. (Cl. 260—45.95)

This invention relates to the stabilization of rubbery materials by incorporating therein reaction products of an alkyl halide and an olefin-alkylated cresylic acid.

In the refining of petroleum there is obtained a product known as the cresylic acid fraction, which is composed chiefly of mixed cresols, xylenols, and other alkylated phenols whose alkyl groups comprise a total if no more than about three carbon atoms. One such commercial product has a boiling range of 92 to 121° C. at a pressure of 10 millimeters of mercury. This boiling range is generally typical of such products. Alkylation with an olefin yields a product which has value as a stabilizer in natural and synthetic rubbers. The olefin used may contain about three to about eight carbon atoms—e. g., isobutylene, amylene, propylene, the octenes, etc.—and a mixture of these may be used. A catalyst, such as sulfuric acid, facilitates the reaction. The product contains a mixture of alkylated compounds, some of which are more highly alkylated than others.

A more highly alkylated phenol—that is, a product which, on the average, contains more alkyl substituents—has greater inhibiting value. However, it is impossible to increase the alkylation by the cheap olefins available—i. e., those containing about three to about eight carbon atoms—because the alkylation process is reversible, and maximum alkylation is obtained when equilibrium conditions are reached. Commercially, the product of the alkylation may be distilled to separate a higher boiling fraction, and the remaining lower boiling fraction may be recycled with fresh cresylic acid and again subjected to alkylation.

It has now been found that the product of such alkylation can be further alkylated by treatment with an alkyl halide in the presence of a catalyst which is the halide of a low molecular weight metal of the third group of the periodic system; e. g., aluminum bromide, aluminum chloride, boron chloride, boron fluoride. The alkyl halide may contain from about three to about eight carbon atoms, such as, for example, isopropyl bromide, tert-butyl chloride, sec-butyl chloride, isoamyl chloride, tert-hexyl chloride and 2-ethylhexyl chloride.

The more highly alkylated products obtained by such additional alkylation are stabilizers for natural and synthetic rubbers. They may be mixed with the rubber in any usual way, as, for example, by milling or in a Banbury mixer. If added to the latex or coagulum of a rubber they serve to stabilize it in the unvulcanized condition, as well as after vulcanizing. They are substantially non-discoloring and are useful in light-colored stocks, such as those to be used for white-sidewall tires, etc.

Although the use of the stabilizer in synthetic rubbers will be exemplified herein by formulations in butadiene copolymers of styrene and acrylonitrile, it may be used generally in rubber-like polymerizates of 1,3-butadiene or other hydrocarbon conjugated dienes, such as for example, isoprene, pentadiene, piperylene, dimethylbutadiene and 2-methylpentadiene. For instance it may be used in rubber-like copolymers of a conjugated diene and a vinyl aromatic compound, such as, for example, styrene, alpha-methylstyrene, nuclearly substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, commercially exemplified by GR-S. It may be used in rubber-like copolymers of a conjugated diene and a monomer having the formula $CH_2=C(R)-CX$ when R is chlorine, methyl, ethyl, propyl or hydrogen and X is $-CN$, $-CONH_2$, $-COR'$ or $-COOR'$ and R' is an alkyl group which contains one to five carbon atoms; a commercial rubber of this type is GR-A. It may also be used in the stabilization of homopolymers of 1,3-butadiene, isoprene, etc.

The following table gives the boiling range of a cresylic acid fraction, and for comparison the boiling range of the products resulting from (a) alkylation by an olefin, (b) alkylation by an alkyl halide, and (c) alkylation by an olefin followed by alkylation by an alkyl halide. The table includes the per cent of residue obtained and an indication of the viscosity of the various products.

TABLE 1

Cresylic acid fraction:
    B. P. 92–121° C./10 mm.
Product of catalyzed isobutylene alkylation:
    B. P. 101–157° C./10 mm.+1% residue
Product of catalyzed butyl chloride alkylation:
    B. P. 110° C./10 mm.—210° C./4 mm.+3% residue; slightly viscous
Product of two-step alkylation:
    B. P. 100–220° C./10 mm.+10% residue; viscous distillate The table shows that the product of the two-step alkylation is a higher boiling, more viscous product. It was prepared as follows:

One hundred grams of a petroleum cresylic acid cut of boiling-point range 92–121° C./10 millimeters and containing 50 grams of toluene as diluent and 20 grams of concentrated sulfuric acid catalyst were stirred at 70° C. for 3 hours while a stream of isobutylene gas was passed through it. The mixture was washed and distilled, yielding a 127-gram fraction of a light yellow distillate with a boiling range of 101–157° C./10 millimeters.

Twenty grams of anhydrous aluminum chloride were dissolved in 100 grams of the above tert-butylated cresylic acid fraction. The mixture was stirred at 38–45° C. for 8 hours during which 200 grams of tert-butyl chloride were added slowly. The reaction mixture was washed with water and with sodium carbonate solution, and was then distilled. The product of this further alkylation step was a dark red, viscous liquid of boiling point 100–220° C./10 millimeters. About 10 grams of residue remained in the still pot. The red product was used as the test stabilizer in the work reported below.

Two per cent of this reaction product, as a sodium oleate aqueous emulsion, was mixed with a GR–S latex obtained by emulsion copolymerization of 1,3-butadiene and styrene. Two per cent of a commercial stabilizer herein identified as Stabilizer No. 1 (heptylated diphenylamine) was similarly compounded with the latex. Coagula obtained by coagulation with aluminum sulfate were dried and then were compounded in the following formula:

| | Parts |
|---|---|
| Copolymer+stabilizer | 100.0 |
| Coumarone resin | 10.0 |
| Accelerator | 1.1 |
| Magnesium oxide | 8.0 |
| Wax | 2.0 |
| Zinc oxide | 100.0 |
| Ultramarine blue | 0.1 |
| Titanium dioxide | 30.0 |
| Sulfur | 4.0 |

The stocks, cured for 50 minutes at 300° C., on testing were found to have the following properties, before and after aging four days at 212° F.

TABLE 2.—PHYSICAL PROPERTIES OF GR–S VULCANIZATE

| Stabilizer | Two-step Reaction Product | Stabilizer No. 1 |
|---|---|---|
| Unaged Vulcanizate: | | |
| Stress at 300% elongation (p. s. i.) | 400 | 400 |
| Tensile strength (p. s. i.) | 925 | 775 |
| Percent elongation at break | 435 | 390 |
| Aged Vulcanizate: | | |
| Stress at 300% elongation (p. s. i.) | 900 | |
| Tensile strength (p. s. i.) | 900 | 625 |
| Percent elongation at break | 300 | 260 |

(p. s. i. stands for pounds per square inch.)

The same stocks and a stock similarly compounded with coagulum containing two per cent of another commercial stabilizer identified herein as stabilizer No. 2 (an alkylphenol sulfide) were subjected to a weathering test. Tapered strips elongated 12½ per cent were exposed to the weather for four months with the following results:

TABLE 3.—GR–S VULCANIZATE WEATHER TESTS

| Stabilizer | Color | | Checking | |
|---|---|---|---|---|
| | Front | Back | Front | Back |
| Two-Step Reaction product | No change | No change | Slight | None. |
| Stabilizer No. 1 | Tan | Tan | Severe | Do. |
| Stabilizer No. 2 | No change | Very slight discoloration. | Moderate | Do. |

Thus, the copolymer stabilized with the reaction product of the two-step alkylation was superior to that similarly stabilized with the commercial stabilizers.

The same vulcanized stocks were subjected to artificial light and the results of the exposure are recorded in the following table:

TABLE 4.—LIGHT TESTS ON GR–S VULCANIZATE

A. *Exposure in fadeometer for 10 hours at 125° F.*

| Stabilizer | Color |
|---|---|
| Reaction Product | Bleached. |
| Stabilizer No. 1 | Medium brown. |
| Stabilizer No. 2 | Bleached. |

B. *Exposure to sun lamp 16 hours at 7 inches*

| Stabilizer | Color |
|---|---|
| Reaction Product | Bleached. |
| Stabilizer No. 1 | Tan. |
| Stabilizer No. 2 | Light cream. |

The stock containing the stabilizer of this invention gave substantially no discoloration.

Tests were conducted on rubber-like copolymer of butadiene and acrylonitrile, referred to herein as GR–A. The stocks were prepared by adding two per cent of the stabilizers in sodium oleate emulsion to the latex resulting from emulsion copolymerization of 1,3-butadiene and acrylonitrile and then coagulating. Another commercial stabilizer, referred to herein as stabilizer No. 3 (phenyl-beta-naphthylamine), was used in the test. The blank used in the test contained sodium oleate emulsion but no stabilizer. The following table notes the color of the samples after drying at an elevated temperature, and the effect of four days aging at 90° C. on the color and physical properties of the samples as determined by manual testing:

TABLE 5.—GR–A AGING

| Stabilizer | Color before Aging | After Aging | |
|---|---|---|---|
| | | Color | Condition |
| Two-Step Reaction Product | Tan | Light brown | Excellent. |
| Stabilizer No. 3 | Brown | Dark brown | Do. |
| Blank | Light tan | Dirty brown | Poor. |

The sample which contained no stabilizer deteriorated and hardened on aging. The reaction product of the two-step alkylation provided age resistance without as much discoloration as the commercial stabilizer.

Stocks were compounded according to the following formula:

| | Parts |
|---|---|
| Copolymer, with or without stabilizer | 100.0 |
| Stearic acid | 3.5 |
| Sulfur | 2.0 |
| Zinc oxide | 5.0 |
| Channel black | 40.0 |
| Accelerator | 1.3 |

The stocks were cured eighty minutes at 274° F. The vulcanizates were subjected to oven-aging and air-bomb aging. Oven-aging involved heating four days at 212° F. Air-bomb aging involved heating under 60 pounds air pressure for 15 hours at 260° F. The following table lists the physical properties of the different products.

TABLE 6.—PROPERTIES OF CURED GR–A

| | Two-Step Reaction Product | Stabilizer No. 3 | Blank |
|---|---|---|---|
| Unaged Vulcanizate: | | | |
| Stress at 300% elongation (p. s. i.) | 1,525 | 1,475 | 2,600 |
| Tensile strength (p. s. i.) | 4,425 | 4,475 | 3,212 |
| Per cent elongation at break | 580 | 590 | 335 |
| Oven-aged Vulcanizate: | | | |
| Stress at 300% elongation (p. s. i.) | 3,550 | 3,475 | |
| Tensile strength (p. s. i.) | 3,950 | 435 | 2,925 |
| Per cent elongation at break | 330 | 365 | 250 |
| Air-bomb-aged Vulcanizate: | | | |
| Stress at 300% elongation (p. s. i.) | 3,100 | 3,475 | 2,300 |
| Tensile strength (p. s. i.) | 270 | 290 | 190 |

Thus the stock containing the reaction product of the two-step alkylation product was far superior in age resistance to vulcanizate containing no stabilizer. It compared favorably with that containing the commercial stabilizer. The following table shows that it is substantially non-discoloring.

The GR–A stocks and a GR–A stock similarly compounded, but containing the aforesaid stabilizer No. 1 were compounded in a mix which was heavily loaded with white pigment, as follows:

| | Parts |
|---|---|
| Copolymer with or without stabilizer | 100.0 |
| Coumarone resin | 7.5 |
| Sulfur | 1.0 |
| Magnesium oxide | 5.0 |
| Zinc oxide | 85.0 |
| Neutral clay | 20.0 |
| Titanium dioxide | 20.0 |
| Accelerator | 1.3 |

The stocks were cured sixty minutes at 280° F. The vulcanizates were exposed to artificial weathering by exposure in a fadeometer for ten hours at 125° F. and exposure to a sun lamp for sixteen hours at seven inches. The results are recorded below.

TABLE 7.—LIGHT TESTS ON CURED GR–A

| Stabilizer | Color after fadeometer exposure | Color after sun lamp exposure |
|---|---|---|
| Reaction Product | Light cream | Light cream |
| Stabilizer No. 1 | Light tan | Light tan |
| Stabilizer No. 3 | Brown | Gray brown |
| Blank | Light cream | Light cream |

Both commercial stabilizers caused discoloration, whereas the stabilizer of this invention was substantially non-discoloring. It discolored no more than the stock containing no stabilizer. It was also shown to be substantially non-discoloring by exposure to natural sunlight.

The reaction product of the two-step alkylation was also found to inhibit the flex-cracking of natural rubber. A stock compounded according to the following formula and a stock similarly compounded but containing no stabilizer was cured sixty minutes at 280° F.

| | Parts |
|---|---|
| Natural rubber (thick gristly crepe) | 100.0 |
| Wax | 2.0 |
| Ultramarine blue | 0.1 |
| Zinc oxide | 70.0 |
| Titanium dioxide | 20.0 |
| Sulfur | 3.0 |
| Stearic acid | 1.2 |
| Accelerator | 0.9 |
| Stabilizer | 1.0 |

On weathering two months in Florida both stocks remained white. Neither did discoloration appear on artificial weathering in a weatherometer.

One-half inch tapered strips of the two natural rubber stocks were flexed with 0–75% elongation until all strips were broken. Cracks in the broken strips were counted. The stocks were evaluated according to flex life and rate of crack formation. The figures in the following table are averages for a number of strips.

TABLE 8.—NATURAL RUBBER FLEXING

| Stabilizer | Flex Life (Hours) | Improvement Over Control | Rate of Crack Formation (Cracks/Hours) | Improvement in Rate |
|---|---|---|---|---|
| | | Percent | | Percent |
| Two-Step Reaction Product | 50.32 | 32 | 2.8 | 56 |
| Blank | 38.13 | | 6.3 | |

The stabilizer of this invention provided considerable improvement in the flex life of this natural rubber white-sidewall stock.

The amount of stabilizer used may vary. Ordinarily about 0.1 to 10.0 parts on the rubber will be used. It may be mixed with other stabilizers. The examples are only illustrative of the invention and all parts given therein are by weight.

This application is a division of applicant's application No. 36,298 filed July 1, 1948, and now abandoned.

What is claimed is:

1. Process of stabilizing a vulcanized rubber composition without substantially increasing its susceptibility to discoloration in light, which comprises adding to an unvulcanized rubber a relatively small amount of the reaction product of an alkyl halide and an olefin-alkylated cresylic acid the alkyl halide containing 3 to 8 carbon atoms in the molecule and the olefin containing 3 to 8 carbon atoms in the molecule, and then vulcanizing the rubber.

2. A vulcanized rubber composition containing a relatively small amount of the reaction product of an alkyl halide and an olefin-alkylated cresylic acid the alkyl halide containing 3 to 8 carbon atoms in the molecule and the olefin containing 3 to 8 carbon atoms in the molecule, the composition characterized by its stability when subjected to oxidative conditions.

3. Process of stabilizing a rubber composition without substantially increasing its susceptibility to discoloration in light, which comprises incorporating in an unvulcanized rubber a relatively small amount of the reaction product of an alkyl halide and an olefin-alkylated cresylic acid the alkyl halide containing 3 to 8 carbon atoms in the molecule and the olefin containing 3 to 8 carbon atoms in the molecule.

4. A stabilized rubber composition containing a relatively small amount of the reaction product of an alkyl halide and an olefin-alkylated cresylic acid the alkyl halide containing 3 to 8 carbon atoms in the molecule and the olefin containing 3 to 8 carbon atoms in the molecule, the composition characterized by its stability when subjected to oxidative conditions and further characterized by its resistance to discoloration when exposed to light.

5. Process of stabilizing a rubber latex against deterioration due to oxidation and heat comprising incorporating in the latex a relatively small amount of the reaction product of an alkyl halide and an olefin-alkylated cresylic acid the alkyl halide containing 3 to 8 carbon atoms per molecule and the olefin containing 3 to 8 carbon atoms per molecule.

6. A rubber latex comprising a relatively small amount of the reaction product of an alkyl halide and an olefin-alkylated cresylic acid the alkyl halide containing 3 to 8 carbon atoms per molecule and the olefin containing 3 to 8 carbon atoms per molecule, the latex and the rubber thereof characterized by superior resistance toward deterioration due to oxidation and heat and by resistance to discoloration when exposed to light.

7. A stabilized rubber composition containing a relatively small amount of the reaction product of tertiary butyl chloride and isobutylene-alkylated petroleum cresylic acid, the reaction product being a viscous liquid boiling at substantially 100–220° C. at 10 mm.

8. Process of stabilizing a rubber against deterioration during drying of the rubber, comprising incorporating in a rubber latex a relatively small amount of the reaction product of an alkyl halide and an olefin-alkylated cresylic acid the alkyl halide containing 3 to 8 carbon atoms per molecule and the olefin containing 3 to 8 carbon atoms per molecule, co-coagulating the latex and reaction product, and then drying the resulting coagulum.

LELAND J. KITCHEN.

REFERENCES CITED

The following references are of record in the file of this patent:

UNITED STATES PATENTS

| Number | Name | Date |
|---|---|---|
| 2,471,887 | Nelson | May 31, 1949 |